US008401935B2

(12) United States Patent
Shintani et al.

(10) Patent No.: US 8,401,935 B2
(45) Date of Patent: Mar. 19, 2013

(54) COORDINATING LICENSE ACTIVATION OF LICENSABLE AUDIO VIDEO (AV) DEVICE COMPONENTS BETWEEN CONTRACT MANUFACTURER AND BRAND MANUFACTURER

(75) Inventors: Peter Shintani, San Diego, CA (US); Ludovic Etienne Douillet, Escondido, CA (US); Aran London Sadja, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/073,047

(22) Filed: Mar. 28, 2011

(65) Prior Publication Data
US 2012/0123916 A1 May 17, 2012

Related U.S. Application Data

(63) Continuation-in-part of application No. 12/970,215, filed on Dec. 16, 2010.

(60) Provisional application No. 61/412,552, filed on Nov. 11, 2010.

(51) Int. Cl.
*G06Q 10/00* (2012.01)
(52) U.S. Cl. ............ 705/30; 705/34; 348/180; 348/143; 725/30; 725/25
(58) Field of Classification Search .................. 705/30, 705/34; 348/180, 143; 725/25, 30
See application file for complete search history.

(56) References Cited

U.S. PATENT DOCUMENTS

| | | | |
|---|---|---|---|
| 6,199,044 B1 | 3/2001 | Ackley et al. | |
| 6,827,260 B2 | 12/2004 | Stoutenburg et al. | |
| 7,350,707 B2 | 4/2008 | Barkan et al. | |
| 7,508,459 B2 | 3/2009 | Mayer et al. | |
| 7,747,533 B2 | 6/2010 | Zhang et al. | |
| 2002/0049717 A1 | 4/2002 | Routtenberg et al. | |
| 2005/0039025 A1 | 2/2005 | Main et al. | |
| 2006/0022034 A1 | 2/2006 | Barkar et al. | |
| 2006/0059571 A1 | 3/2006 | Chen et al. | |
| 2006/0088010 A1 | 4/2006 | Buchwald et al. | |
| 2006/0106726 A1 | 5/2006 | Raley et al. | |
| 2006/0146200 A1 | 7/2006 | Edde et al. | |
| 2007/0027815 A1* | 2/2007 | Sobel et al. | 705/59 |
| 2007/0174919 A1 | 7/2007 | Raines et al. | |
| 2008/0083040 A1 | 4/2008 | Dani et al. | |
| 2008/0134237 A1 | 6/2008 | Tu et al. | |
| 2008/0250443 A1 | 10/2008 | Fan et al. | |
| 2008/0313086 A1* | 12/2008 | Milgramm | 705/55 |
| 2009/0006225 A1* | 1/2009 | Multerer et al. | 705/30 |
| 2009/0019501 A1 | 1/2009 | Saxena et al. | |
| 2009/0212909 A1 | 8/2009 | Burger et al. | |
| 2009/0293560 A1 | 12/2009 | Ikeguchi | |
| 2009/0319410 A1* | 12/2009 | Kight et al. | 705/34 |

(Continued)

OTHER PUBLICATIONS

Peter Shintani, Aran London Sadja, Ludovic Douillet; "Activating Licensable Component of Consumer Electronics Device at Point of Sale", Non-final office action dated Apr. 25, 2012 in related U.S. Appl. No. 13/049,021.

(Continued)

*Primary Examiner* — Vanel Frenel
(74) *Attorney, Agent, or Firm* — John L. Rogitz (57) ABSTRACT

A contract manufacturer (CM) makes a consumer electronics (CE) device under the auspices of a brand name manufacturer (BNM) associated with the CE device, paying royalties immediately on licensable components in the CE device that are activated for sale and not paying royalties on licensable components in the CE device that are deactivated for sale. Should a purchaser subsequently activate an originally deactivated licensable component, the CM receives this information and pays royalties accordingly on the now-activated licensable component.

9 Claims, 6 Drawing Sheets

U.S. PATENT DOCUMENTS

| | | | |
|---|---|---|---|
| 2009/0320073 | A1 | 12/2009 | Reisman |
| 2010/0156592 | A1 | 6/2010 | Lewis |
| 2010/0164681 | A1 | 7/2010 | Harris |
| 2010/0218181 | A1 | 8/2010 | Seiden |
| 2011/0054923 | A1* | 3/2011 | Miloslavsky et al. .......... 705/1.1 |
| 2011/0166968 | A1* | 7/2011 | Houng et al. ................... 705/30 |
| 2011/0302623 | A1* | 12/2011 | Ricci ................................ 726/1 |

OTHER PUBLICATIONS

Peter Shintani, Aran London Sadja, Ludovic Douillet; "Activating Licensable Component of Consumer Electronics Device at Point of Sale", Applicants response to Non-final office action dated Apr. 25, 2012 in related U.S. Appl. No. 13/049,021 filed May 14, 2012.

Peter Shintani, Ludovic Douillet, "Activating Licensable Component provided by Third Party to Audio Video Device", related pending U.S. Appl. No. 13/034,179, filed Feb. 24, 2011.

Peter Shintani, Ludovic Douillet, "Activating Licensable Component Using Aggregating Device in Home Network", related pending U.S. Appl. No. 13/034,093, filed Feb. 24, 2011.

Peter Shintani, Aran Sadja, Theodore R. Booth, Ludovic Douillet, "Reducing TV Licensable Costs", related pending U.S. Appl. No. 12/970,215, filed Dec. 16, 2010.

Peter Shintani, Aran Sanja, Ludovic Douillet, "Activating Licensable Component of Comsumer Electronic Device at Point of Sal", related pending U.S. Appl. No. 13/049,021, filed Mar. 16, 2011.

Peter Shintani, Aran Sadja, Ludovic Douillet, "Activating Licensable Component of Consumer Electronic Device Post-Sale Using Software Package", related pending U.S. Appl. No. 13/072,241, filed Mar. 28, 2011.

Peter Shintani, Aran Sadja, Ludovic Douillet, "Tracking Details of Activation of Licensable Component of Consumer Electronic Device", related pending U.S. Appl. No. 13/072,978, filed Mar. 28, 2011.

Peter Shintani, "Tracking Activation of Licensable Component in Audio Video Device by Unique Product Identification", related pending U.S. Appl. No. 13/048,981, filed Mar. 16, 2011.

Peter Shintani, Stephane LeJune, Robert Blanchard, Graham Clift, "Audio Video Device with Externally Bundled TV Tuner", related pending U.S. Appl. No. 13/073,222, filed Mar. 28, 2011.

Peter Shintani, "Supplying Omitted Critical Code Portion to Activate Licensable Component in Audio Video Device", related pending U.S. Appl. No. 13/045,835, filed Mar. 11, 2011.

Peter Shintani, Aran Sadja, Theodore R. Booth, Ludovic Douillet, "Reducing TV Licensing Costs", related pending U.S. Appl. No. 12/970,215 non-final office action dated Jun. 18, 2012.

Peter Shintani, Aran Sadja, Theodore R. Booth, Ludovic Douillet, "Reducing TV Licensing Costs", related pending U.S Appl. No. 12/970,215 applicants response filed Jun. 22, 2012 to the non-final office action dated Jun. 18, 2012.

Peter Shintani, Aran London Sadja, Ludovic Douillet, co-pending U.S. Appl. No. 13/049,021 titled "Activating Licensable Component of Consumer Electronics Device at Point of Sale" final office action dated Aug. 3, 2012.

\* cited by examiner

Figure 1 System

Figure 2 TV

Figure 3
Setup logic

Figure 4
auto license logic

Figure 6
Via Automated Phone Support

Figure 7 Via Web

US 8,401,935 B2

COORDINATING LICENSE ACTIVATION OF LICENSABLE AUDIO VIDEO (AV) DEVICE COMPONENTS BETWEEN CONTRACT MANUFACTURER AND BRAND MANUFACTURER

This application claims priority to U.S. patent application Ser. No. 12/970,215, filed Dec. 16, 2010 and to U.S. provisional patent application Ser. No. 61/412,552, filed Nov. 11, 2010.

FIELD OF THE INVENTION

The present application relates generally to coordinating license activation of licensable audio video (AV) device components between a contract manufacturer and a brand manufacturer whose devices the contract manufacturer make under contract.

BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. Nonetheless, license fees for the unused technologies are still paid, unnecessarily cascading cost. This can be complicated when a client device may be part of a home network and may not have wide area network connectivity, instead communicating with other components in the network using Bluetooth or other network that might not employ Internet Protocol. Moreover, present principles recognize that advantages can accrue to licensors from incremental versus bundled licenses since when features are added to an existing product, additional royalties could be extracted from the licensee. Also, selling a product in a less capable state can lower the selling price and increase sales volumes so that more purchasers are available to decide to activate licensable features after buying a product and developing a desire for better capability at only incremental cost, potentially leading to overall increased royalties.

Accordingly, a method is disclosed for coordinating license activation for a licensable audio video (AV) device component between a contract manufacturer (CM) of the AV device, and a brand name manufacturer (BNM) under whose brand the CM makes the CE device. The method includes causing the CM which is making a brand name CE device with licensable components, some of which are activated and at least a first licensable component of which is deactivated at time of sale of the CE device, to, on behalf of the BNM, pay royalties only for licensable components which are activated for initial sale. Licenses are not paid for licensable components which are disabled or deactivated for sale including the first licensable component. The method includes receiving an activation message from a purchaser of the CE device to activate a first licensable component therein. Responsive to the activation message, the CM, on behalf of the BNM, generates accounting data related a royalty associated with the first licensable component in fulfillment of a license agreement appertaining to the first licensable component. The activation message may be received at the CM from the BNM or from the CE device.

In another aspect, a contract manufacturer (CM) server includes a processor accessing instructions on a computer readable storage medium to generate license data for an activated licensable component of a CE device made by the CM under a brand name manufacturer (BNM). The processor does not generate license data for a first licensable component of the CE device that is not activated in the CE device prior to sale of the CE device. An activation message may be received from a purchaser of the CE device to activate a first licensable component therein and responsive to the activation message, accounting data is generated which relates to a royalty associated with the first licensable component in fulfillment of a license agreement appertaining to the first licensable component.

In another aspect, a server associated with a contract manufacturer (CM) making a consumer electronics (CE) device under the auspices of a brand name manufacturer (BNM) associated with the CE device includes a processor accessing logic on a computer readable storage medium to cause the processor to record that royalties are due immediately on licensable components in the CE device that are activated for sale. The processor, however, does not record that royalties are due on at least a first licensable components in the CE device that is deactivated for sale. Responsive to a purchaser of the CE device subsequently activating the first licensable component, the processor records that a royalty is due accordingly for the first licensable component.

The details of the present invention, both as to its structure and operation, can best be understood in reference to the accompanying drawings, in which like reference minerals refer to like parts, and in which:

DETAILED DESCRIPTION OF THE PREFERRED EMBODIMENT

Figure 1:
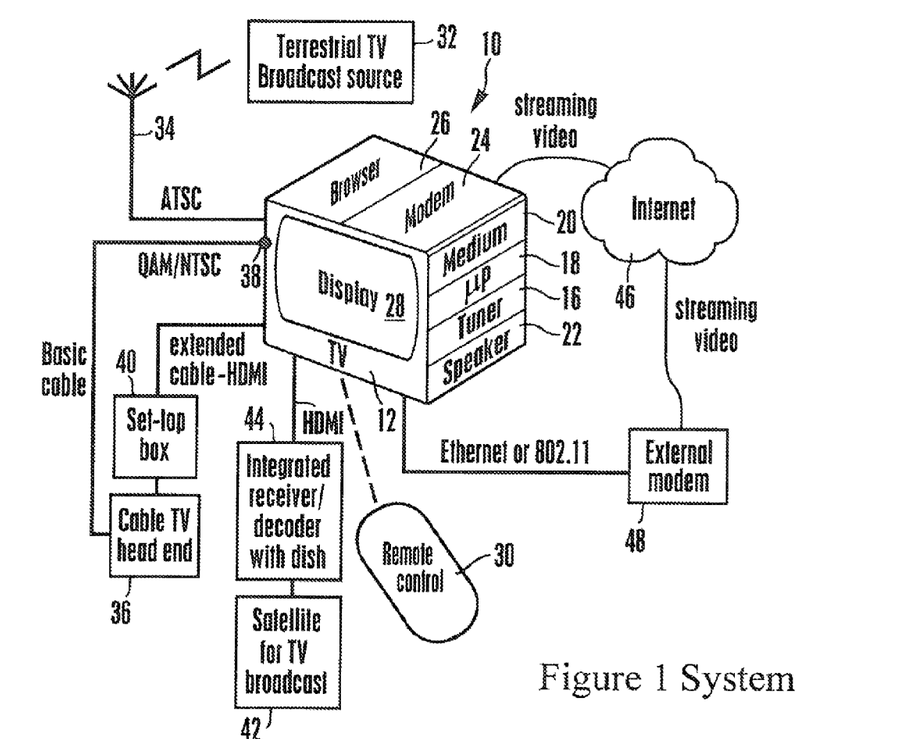
FIG. 1 is a block diagram of a non-limiting example system in accordance with present principles.

Referring initially to the non-limiting example embodiment show in FIG. 1, a system 10 includes an audio video device 12 such as a TV including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case, which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received, by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Figure 2:
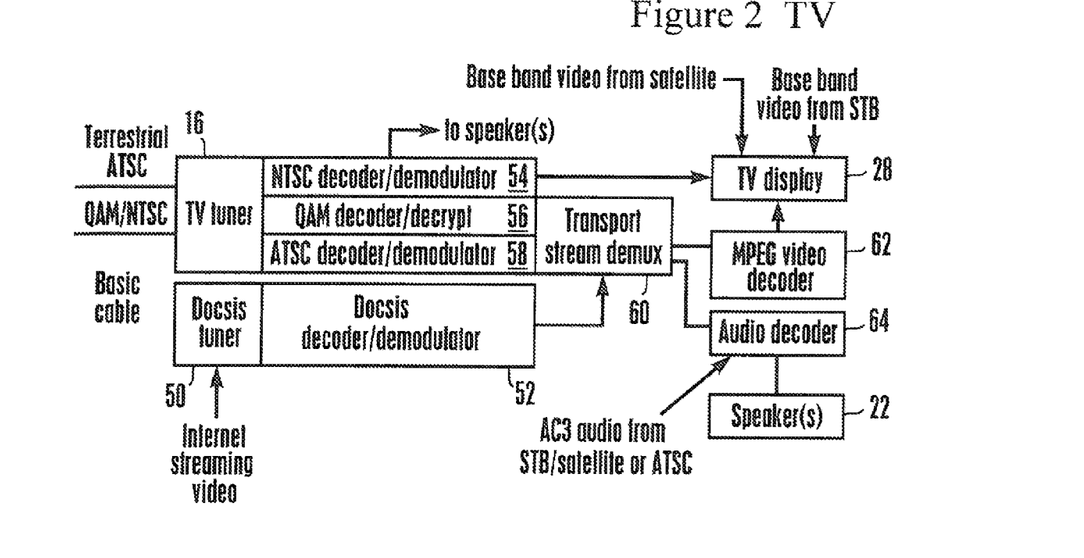
FIG. 2 is a block diagram of an example TV.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Figure 3:
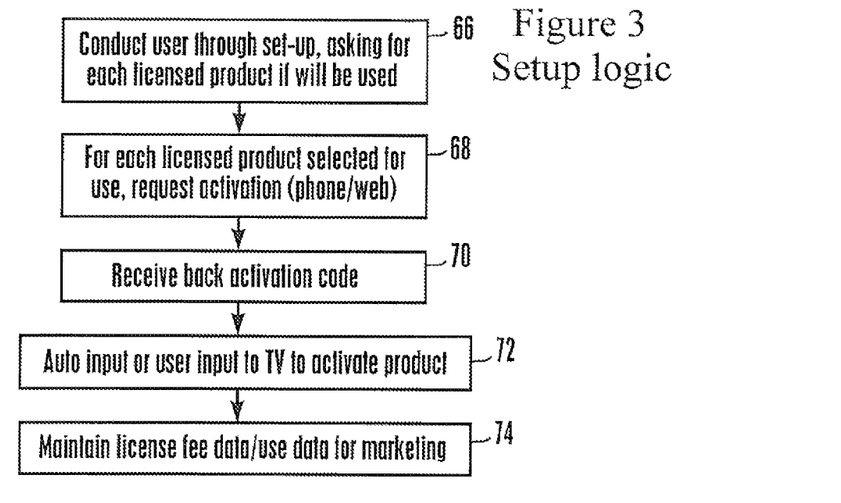
FIG. 3 is a flow chart of non-limiting TV set up logic in accordance with present principles.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be requited based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user input at block 66 along with a unique identification of the TV, e.g., a hash of the TV model number and serial number, in some embodiments encrypted if desired. Or, the unique identifier may be a high definition content protect (HDCP) key selection vector (KSV) of the device 12, or a media access control (MAC) address, or a digital transmission content protect (DTCP) certificate, one or more of which may be hashed with the serial number and/or model name of the device 12.

This hashed result can be sent to the server. The server can now uniquely identify the device. In the event the device needs to be repaired and the unique ID contained in the device is changed, the device's previous identity advantageously can be migrated to a new hashed ID. To simplify this migration of the ID, the server can generate a unique key, and send it, to the repaired device after receiving the initial hashed ID and notification (e.g., from the device 12) that the device was repaired and requires a new unique ID. In some implementations the user of the device 12 can manually recall the original ID, send it to the server, and the server, using the original ID, migrates records of the licenses previously enabled by the device 12 to the new ID.

The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. Or the associated component may require software code to function and a critical piece of the code which is related to the licensable feature may be omitted when the device is vended, with this critical piece of code being supplied at block 70 to enable the licensable feature of the component. Prior to provision of the critical piece of code, the licensable feature of the component in effect is not merely locked out, but rather is effectively missing altogether, even though other parts of software code needed to execute the licensable feature are vended with the device.

The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
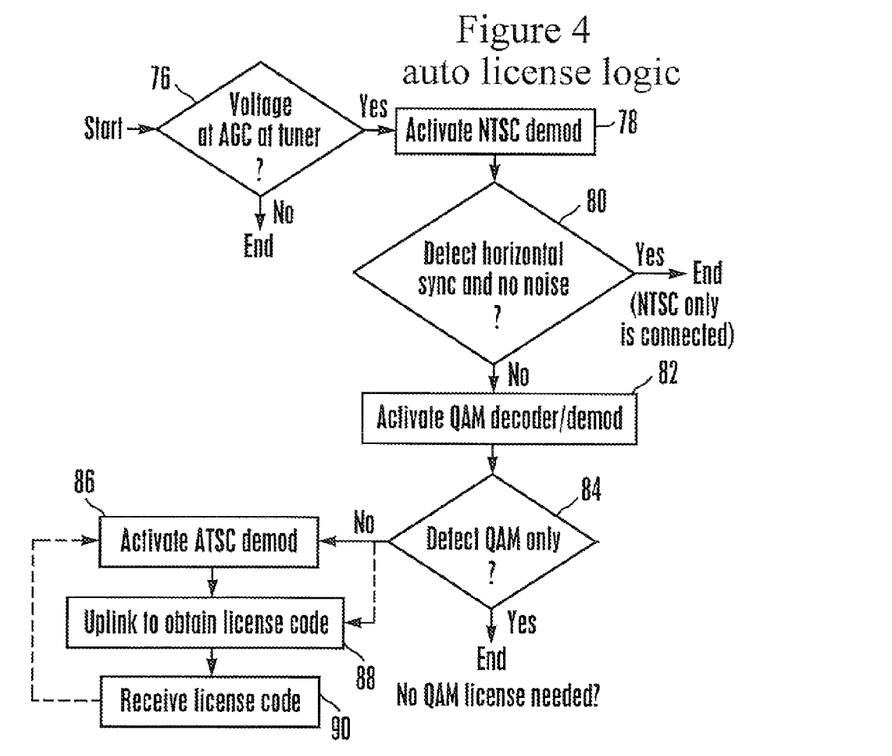
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. PAL or SECAM can also be used. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18 to the above-described licensing entity/agent to obtain the license code discussed above using the unique ID of the TV, and at block 90 the code is received and used as necessary to permit use of the ATSC decoder/demodulator 58.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulate 58.

Yet again, as shown in dashed lines in FIG. 4 the logic may flow first from decision diamond 84 to blocks 88 and 90 to Obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically Obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
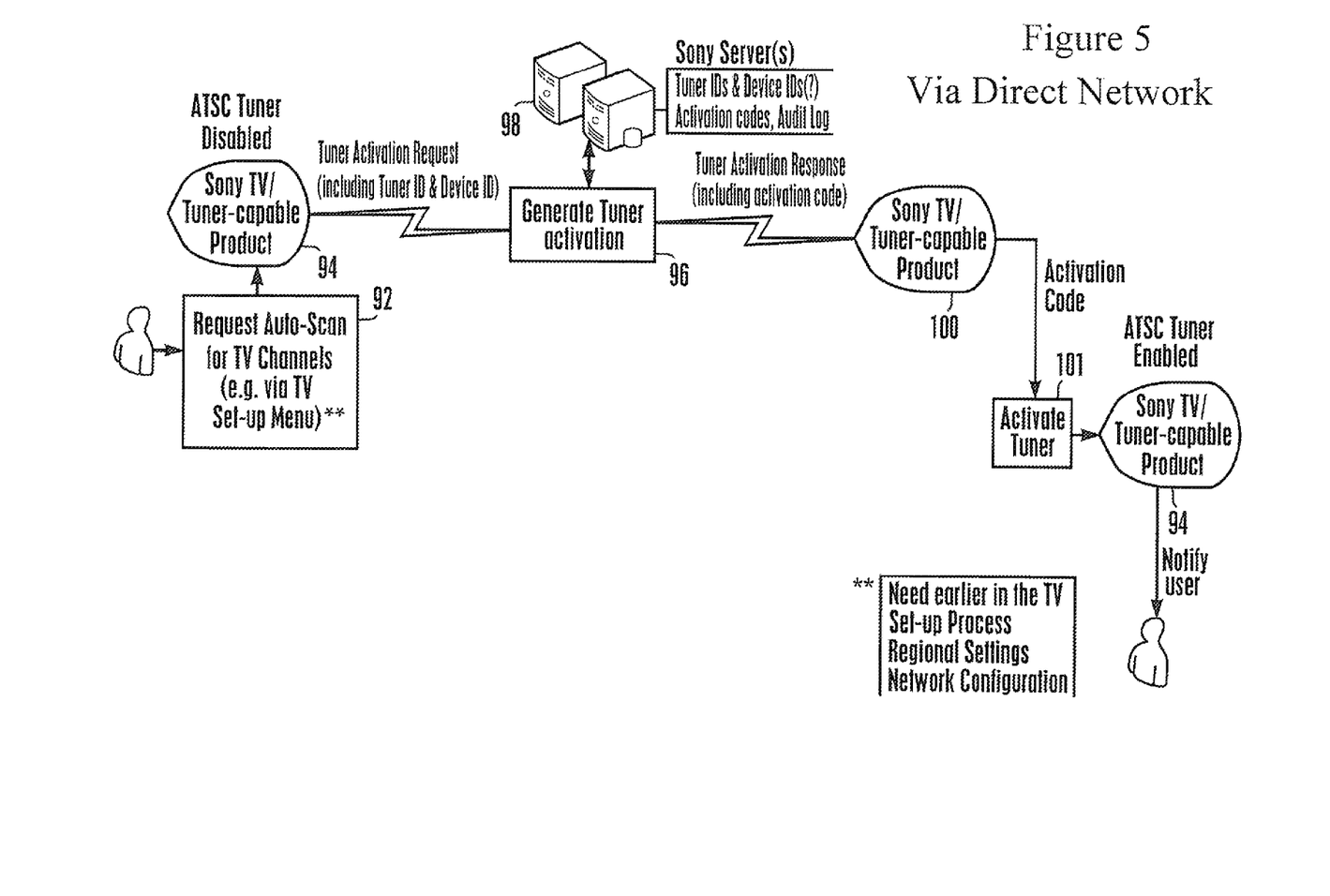
FIGS. 5-7 are schematic diagrams illustrating alternate methods for activating an ATSC demodulator.
Figure 6:
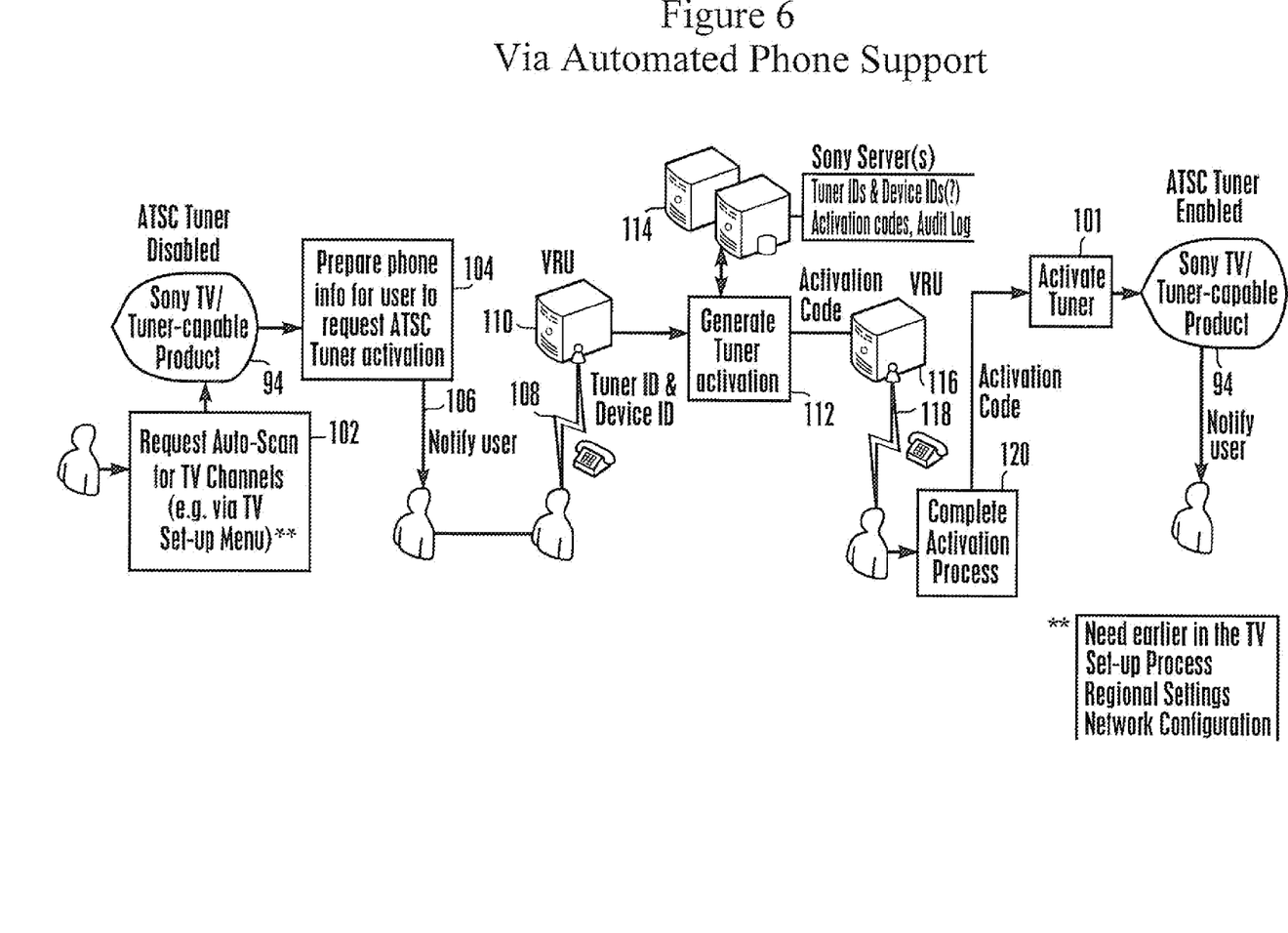
Figure 7:
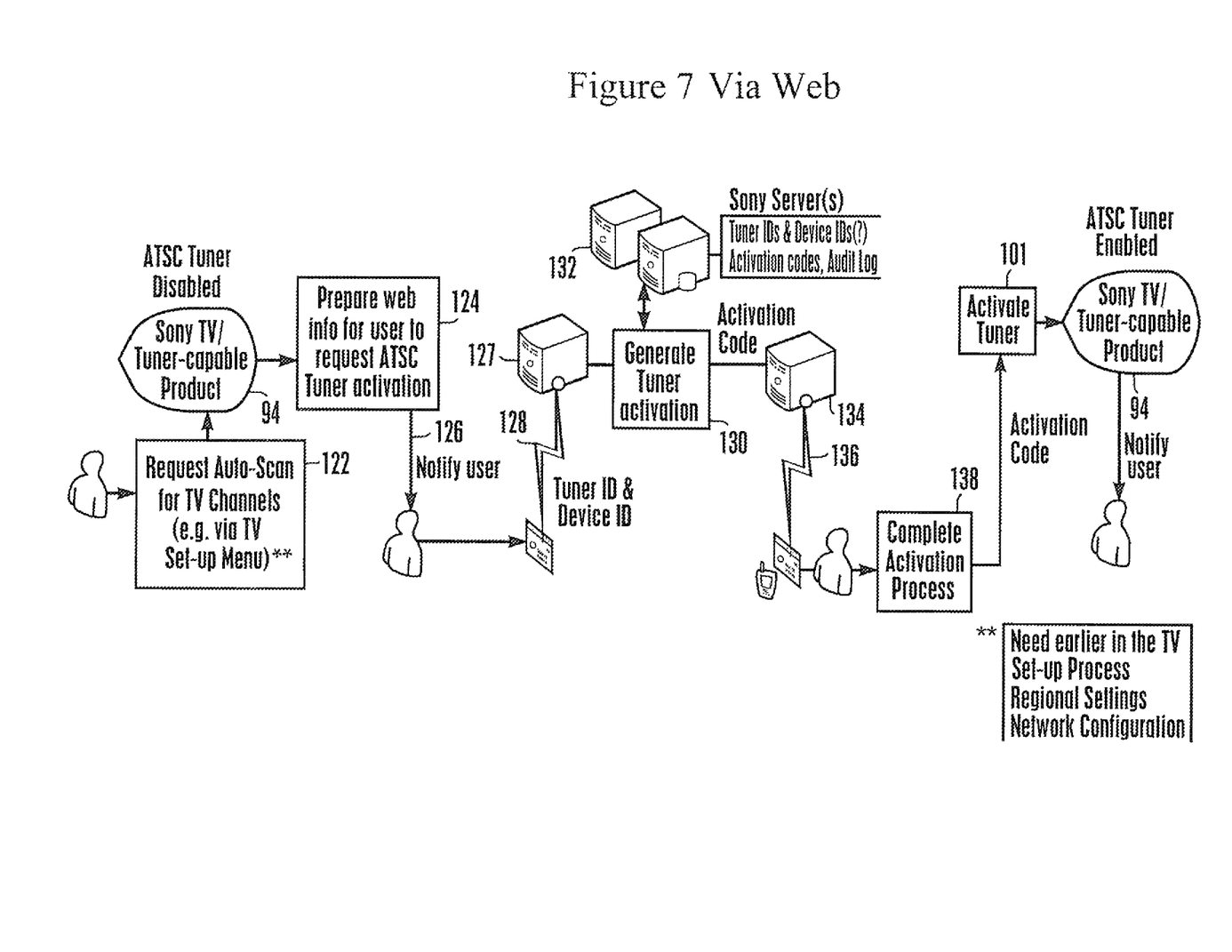

FIGS. 5-7 illustrate logic that may be used, during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is prepared and the user notified 106 of the information by means of, e.g., a user interface or prompt, presented on the product 94. The user enters 108 the information into a telephone, either by speaking the number or by holding the telephone adjacent a Speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such, as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

Figure 8:
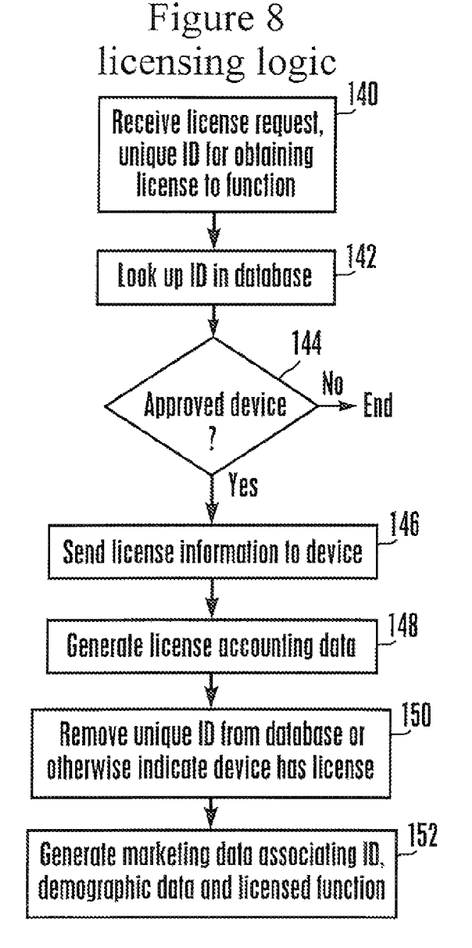
FIG. 8 is a flow chart of non-limiting logic for licensing a component in a TV.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the Manufacturer of the requesting device to the licensing authority for the component that is the subject of the request. At block 150 the authorized device database is modified to record the giant of the license.

Marketing data may be generated at block 152 based on the license grant. As an example, the total number of devices vended with the licensable component may be compared against, the number of licenses granted to requesting devices to ascertain usage of the component compared to other components within the requesting device. For instance, it might be noted that 30% of vended, devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Figure 9:
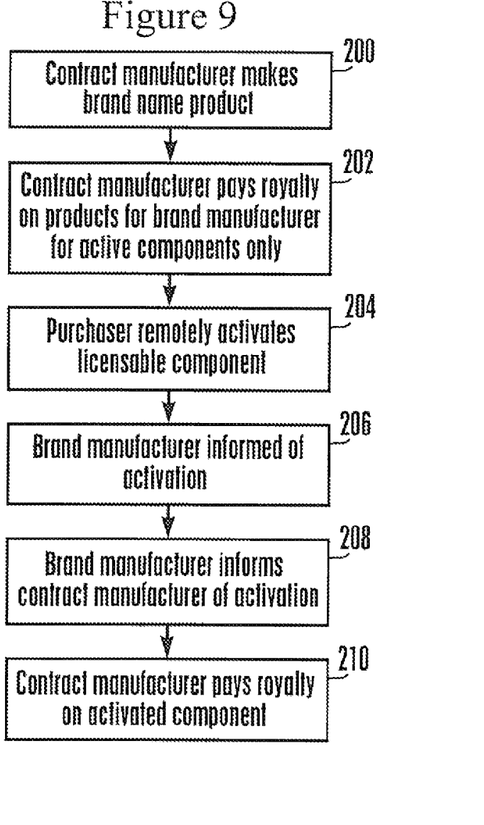
FIG. 9 is a flow chart showing the coordination of license activation for a licensable audio video (AV) device component between a contract manufacturer of the AV device and the brand name manufacturer.

FIG. 9 shows logic for the coordination of license activation for a licensable audio video (AV) device component between a contract manufacturer (CM) of the AV device, and the brand name manufacturer (BNM) under whose brand and auspices the contract manufacturer makes the CE device, with the BNM typically remaining responsible for sales of CM-made CE devices. Commencing at block 200, the CM makes a brand name CE device with licensable components, some of which may be activated and some of which may be deactivated at the time of sale. At block 202 the CM, on behalf of the BNM, pays royalties for those licensable components which are activated for initial sale. Licenses are not paid for licensable components which are disabled or deactivated for sale.

A purchaser then buys the CE device at block 204 and subsequently activates one or more of the deactivated licensable components in accordance with prior disclosure. Since activation messages are sent through the BNM at block 206, at block 208 the BNM informs the CM of the activation of the licensable component(s).

Consequently, the CM, on behalf of the BNM, can pay the necessary royalties on the newly activated licensable components at block 210. The CM and BNM may agree, however, that the above activation messages, in some implementations, may be sent directly to the CM, bypassing the BNM and thus altering the above logic to move from block 204 after informing the CM from the CE device of the activation directly to block 210.

Without limitation, the need for paying for licenses for the following technologies may be determined during TV set-up or subsequently by automatically detecting whether the technologies are being used:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital, AC3 5.1ch, Dolby Digital Plus (DD+) 2ch, ProLogic2 (Surround Sound), MPEG audio 1&2 layer 1, 2, 3) MP3, DTS_Blueray disk (BD) (2CH/2CH+ Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS), ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MHP/Ging a interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable, component in production, pre-sale, without triggering the above-described license request mechanisms. A TV may be placed in a test activation mode used only in the manufacturing or test phase, and if desired the test mode may have a hardwired time out. A test key or keys can be used to activate licensable components and the license request algorithm recognizes a test key and responsive to the recognition does not request a license. The test activation mode may be hardwired to deactivate after a single power cycle and, the TV processor may not permit reactivation of the test mode thereafter. Activation of a licensable component thereafter requires a production key which is associated with a license request.

The messaging, activation, and license payment logic in FIG. 9 may be executed by servers respectively associated with the CM and BNM and having processors, computer readable storage media, network interfaces and the like along the lines of the servers described above.

While the particular COORDINATING LICENSE ACTIVATION OF LICENSABLE AUDIO VIDEO (AV) DEVICE COMPONENTS BETWEEN CONTRACT MANUFACTURER AND BRAND MANUFACTURER is herein shown and described in detail, it is to be understood that the subject matter which is encompassed by the present invention is limited only by the claims.

What is claimed is:

1. Method for coordinating license activation for a licensable audio video (AV) device component between a contract manufacturer (CM) of the AV device, and a brand name manufacturer (BNM) under whose brand the CM makes the CE device, comprising:

causing the CM making a brand name CE device with licensable components, some of which are activated and at least a first licensable component being deactivated at time of sale of the CE device, to, on behalf of the BNM, pay royalties only for licensable components which are activated for initial sale, licenses not being paid for licensable components which are disabled or deactivated for sale including the first licensable component;

receiving an activation message from a purchaser of the CE device to activate a first licensable component therein; and responsive to the activation message, the CM, on behalf of the BNM, generating accounting data related a royalty associated with the first licensable component in fulfillment of a license agreement appertaining to the first licensable component.

2. The method of claim 1, comprising receiving the activation message at the CM from the BNM.

3. The method of claim 1, comprising receiving the activation message at the CM from the CE device.

4. Contract manufacturer (CM) server including a processor accessing instructions on a computer readable storage medium to:

generate license data for an activated licensable component of a CE device made by the CM under a brand name manufacturer (BNM);

not generating license data for a first licensable component of the CE device that is not activated in the CE device prior to sale of the CE device;

receive an activation message from a purchaser of the CE device to activate a first licensable component therein; and responsive to the activation message, generate accounting data related to a royalty associated with the first licensable component in fulfillment of a license agreement appertaining to the first licensable component.

5. The CM server of claim 4, wherein the processor receives the activation message at the CM from a server associated with the BNM.

6. The CM server of claim 4, wherein the processor receives the activation message from the CE device.

7. A server associated with a contract manufacturer (CM) making a consumer electronics (CE) device under the auspices of a brand name manufacturer (BNM) associated with the CE device, comprising:

processor accessing logic on a computer readable storage medium to cause the processor to:

record that royalties are due immediately on licensable components in the CE device that are activated for sale and not record that royalties are due on at least a first licensable components in the CE device that is deactivated for sale;

responsive to a purchaser of the CE device, subsequently activating the first licensable component, record that a royalty is due accordingly for the first licensable component.

8. The server of claim 7, wherein the processor receives an activation message at the CM from a server associated with the BNM, the activation message indicating that the purchaser has activated or desired to activate the first licensable component.

9. The server of claim 7, wherein the processor receives an activation message from the CE device, the activation message indicating that the purchaser has activated or desired to activate the first licensable component.

\* \* \* \* \*